(12) United States Patent
Lathwesen

(10) Patent No.: US 8,770,356 B2
(45) Date of Patent: Jul. 8, 2014

(54) BRAKE DISC AND METHOD FOR PRODUCING SUCH A BRAKE DISC

(75) Inventor: Holger Lathwesen, Heigenhausen (DE)

(73) Assignee: Sheet Cast Technologies GmbH, Ingolstadt (DE)

(*) Notice: Subject to any disclaimer, the term of this patent is extended or adjusted under 35 U.S.C. 154(b) by 0 days.

(21) Appl. No.: 13/378,622

(22) PCT Filed: Jun. 17, 2010

(86) PCT No.: PCT/EP2010/058583
§ 371 (c)(1),
(2), (4) Date: Dec. 15, 2011

(87) PCT Pub. No.: WO2010/146137
PCT Pub. Date: Dec. 23, 2010

(65) Prior Publication Data
US 2012/0090929 A1    Apr. 19, 2012

(30) Foreign Application Priority Data

Jun. 19, 2009 (DE) .......................... 10 2009 027 063
Jun. 23, 2009 (DE) .......................... 10 2009 027 116

(51) Int. Cl.
*F16D 65/12*    (2006.01)

(52) U.S. Cl.
USPC .......... 188/218 XL; 188/218 A; 188/218 AA; 188/218 R

(58) Field of Classification Search
USPC .. 188/18 A, 218 R, 218 A, 218 AA, 218 XL; 29/527.1, 527.5
See application file for complete search history.

(56) References Cited

U.S. PATENT DOCUMENTS 2,243,334 A * 5/1941 Eksergian ............... 188/218 XL
2,753,959 A * 7/1956 Johnson .................. 188/218 XL
(Continued)

FOREIGN PATENT DOCUMENTS

DE          137 910          10/1979
DE          40 03 732 A1     8/1991
(Continued)

OTHER PUBLICATIONS

German Patent Office Search Report, Feb. 1, 2010.
(Continued)

*Primary Examiner* — Robert A Siconolfi
*Assistant Examiner* — Mahbubur Rashid
(74) *Attorney, Agent, or Firm* — Dority & Manning, P.A.

(57) ABSTRACT

The invention relates to a brake disc (8) having a friction ring (10) made of a frictional pair (11a, 11b) connected to each other by means of ribs (4), having a pot (9) and expansion elements (2) disposed radially to the pot (9), preferably at the outer circumference of the pot (9), and the ends thereof facing away from the pot (9) are connected to the friction ring (10). At least one expansion element (2) at least partially forms a rib (4) for connecting the friction pair (11a, 11b). The invention further relates to a method for producing such a brake disc (8), wherein expansion elements (2) are connected by casting to a friction ring (10) and/or to a pot (9). The friction ring (10) and/or the pot (9) comprise at least one protective element after being connected, wherein the friction ring (10) and/or the pot (9) is cast in a single piece with the protective element.

15 Claims, 11 Drawing Sheets

(56) References Cited

U.S. PATENT DOCUMENTS

| | | | |
|---|---|---|---|
| 3,026,431 A * | 3/1962 | Bessiere | 310/93 |
| 3,486,218 A * | 12/1969 | Buyze | 219/121.14 |
| 4,501,346 A * | 2/1985 | Bogenschutz | 188/218 XL |
| 4,712,656 A | 12/1987 | Courtois | |
| 4,853,574 A | 8/1989 | Estaque | |
| 4,982,127 A * | 1/1991 | Marandet | 310/105 |
| 5,279,396 A * | 1/1994 | Estaque et al. | 188/264 A |
| 5,810,123 A * | 9/1998 | Giorgetti et al. | 188/218 XL |
| 6,032,769 A * | 3/2000 | Daudi | 188/218 R |
| 7,228,946 B2 * | 6/2007 | Baumgartner et al. | 188/218 XL |
| 7,600,614 B2 | 10/2009 | Doppling et al. | |
| 2003/0159893 A1 * | 8/2003 | Tironi | 188/71.1 |
| 2004/0124045 A1 | 7/2004 | Mathern | |
| 2005/0032469 A1 * | 2/2005 | Duescher | 451/548 |
| 2007/0181390 A1 * | 8/2007 | Korm | 188/218 XL |
| 2009/0071779 A1 | 3/2009 | Lowe et al. | |

FOREIGN PATENT DOCUMENTS

| | | |
|---|---|---|
| DE | 10 2008 016 037 A1 | 11/2008 |
| DE | 10 2007 013 512 A1 | 9/2009 |
| EP | 1 972 823 A1 | 9/2008 |
| GB | 2 307 960 A | 6/1997 |

OTHER PUBLICATIONS

PCT IPRP and Search Report, Jan. 5, 2012.

* cited by examiner

E-E

BRAKE DISC AND METHOD FOR PRODUCING SUCH A BRAKE DISC

FIELD OF THE INVENTION

This invention refers to a brake disc, especially for motor vehicles, utility vehicles and/or rail vehicles; an insert for an expansion element and/or a rib for connecting with a friction ring and/or a pot of such a brake disc; as well as to a method for producing such a brake disc.

BACKGROUND

A brake disc is known from DE 10 2007 013 512 A1 that has a radially internal supporting part that can be supported on a vehicle axis or vehicle wheel and a radially external friction disc that is connected to the radially internal supporting part via connecting elements extending in the radial direction. For connecting the connecting elements extending radially with the supporting part or the friction disc, at least the radial ends of the connecting elements are form fittingly surrounded or cast in by the supporting part or friction disc. Furthermore, the friction disc has two axially opposing friction rings, connected to each another via cooling ribs, extending radially towards the interior opposite the friction rings for creating the connecting elements. A significant disadvantage of this device lies in the fact that the axially opposing friction rings, the cooling ribs, and the connecting elements are made of one single piece and from the same material, especially gray cast iron. This results in a relatively high overall weight of the brake disc, which has a negative effect on the vehicle's fuel consumption.

SUMMARY

A task of this invention is therefore to produce a brake disc, an insert for an expansion element, and/or a rib of such a brake disc, as well as a method for producing such a brake disc to lower its weight—especially with regard to the lower fuel consumption—but largely maintain the same high strength and low manufacturing costs. Additional objects and advantages of the invention will be set forth in part in the following description, or may be obvious from the description, or may be learned through practice of the invention.

According to the invention, the brake disc (which is used above all in motor vehicles, utility vehicles and/or rail vehicles) has a pot, expansion elements and a friction ring. The friction ring consists of a friction strip pair connected to one another through ribs. The expansion elements are radially arranged on the pot, preferably on the pot's external perimeter, and connected to the friction ring on the end that faces away from the pot. At least some of the ribs and/or expansion elements are formed at least partially by inserts. Furthermore, at least one expansion element forms—at least partially—one rib for connecting the friction strip pair. Thus, it is advantageous for the rib—compared to the friction strip pair, which is generally a gray cast iron part or a coated aluminum cast part—to be made fully or at least partially of a lighter material for attaining an enormous weight reduction, which in turn has a favorable effect on fuel consumption. However, this characteristic according to the invention also has a favorable effect on the brake disc's damping, vibration and cooling behavior because not only the material but also the shaping, inclination and special arrangement of the ribs between the friction strip pair can be optimized, detached from the manufacturing limitation imposed by casting techniques. Brake discs manufactured so far have the problem called hot spot, i.e. heat patches on the friction strip pair surface, caused especially by a radially inhomogeneous mass distribution of the friction ring, which stimulates the braking and steering system to start making undesired vibrations. The ribs formed at least partially by the expansion elements can—taking an ideal radial heat distribution of the friction ring into account—be shaped in such a way that the friction ring's ideal mass distribution becomes largely homogenous. The inhomogeneous deformation of the friction strip pair caused by the thermo-mechanical stress of the braking process and the resulting brake judder can consequently be largely ruled out.

When braking, the friction strip pair heats up considerably more compared to the pot, so that the temperature gradient occurring in the direction of the pot, the heat flux density in the friction strip pair that increases with growing radius, and the generally rigid connection between pot and friction ring that cause thermo-mechanical stresses to appear, can lead to the dishing of the friction strip pair and cracks in the brake disc. Dishing is understood as the tilting of the friction ring in the radial direction relative to the brake shoes, which has a very negative effect on the braking properties of the brake disc. To prevent these negative effects, it is particularly advantageous for the expansion elements to be longer than the shortest distance between the pot and friction ring, especially when this is caused by a bending. Consequently, the expansion elements can adjust to the thermally generated expansion of the friction strip pair, so that the thermo-mechanical stresses that occur between friction strip pair and pot—as well as the inhomogeneous deformation of the friction ring caused by thermo-mechanical effects—can be greatly reduced. In this context, it is likewise advantageous for the expansion elements to be designed in a radially elastic fashion so they can adjust themselves to the thermal deformation of the friction ring.

It is particularly advantageous if the ribs are made from several individual parts and at least one of these individual parts has been cast as one single piece with the friction strip pair so that the rib's strength, heat conductivity, cooling behavior and vibration behavior properties can be favorably influenced.

With regard to this, it is likewise advantageous for the rib to have at least one recess. From the mentioned parameters, this characteristic in particular can have a positive influence on the brake disc's cooling behavior.

It is especially advantageous for the ribs and/or expansion elements to be formed at least partially by inserts. In brake disc manufacturing that applies casting techniques, this has the special advantage that the inserts can have properties given by their material and form that cannot be achieved by ribs and/or expansion elements manufactured by casting alone.

When the connections between the inserts and the friction strip pair have been created by casting, the manufacturing costs for brake discs can be advantageously lowered a great deal. In this case, it is also advantageous for the inserts to be form-fittingly and/or substance-to-substance bonded to the friction strip pair and/or pot. A form-fitting and substance-to-substance bond is also advantageous for resisting the strong thermo-mechanical stresses that occur during braking. In addition, such a connection or bond is easier and less expensive to produce than the state-of-the-art device mentioned above. Here, it is absolutely necessary to prevent a substance-to-substance bond between the connection pieces and the pot in order to reduce stresses between the friction ring and the pot. This is very difficult to accomplish with casting techniques and consequently entails higher manufacturing costs.

To increase strength, it is likewise advantageous for the inserts to have at least two connecting surfaces for bonding with the friction strip pair. In this case, the connecting surfaces have at least some seams and/or teeth arranged on the connecting surfaces to ensure a firm form-fitted and/or substance-to-substance bond. Seams are understood as protrusions and depressions in the region of the connecting surfaces that occur when the insert's connecting surfaces are deformed under pressure. In an especially advantageous embodiment, the teeth are regularly set for improving the strength of the form-fitted and/or substance-to-substance bond. Depending on the type of connection desired, the teeth/and or seams of the inserts can be fully or partially melted away when the casting technique creates the connection with the friction strip pair. Alternatively, they can also be largely preserved. The teeth and seams substantially enlarge the connecting surface with the friction strip pair.

It is especially advantageous if the inserts—which can at least be partially designed as a rib or as an expansion element with rib—have an axially elastic design with regard to the brake disc's rotational axis, especially in the region of the friction strip pair. In this case, the inserts' cross section has especially a bending, kink, profiling, curvature, free-form geometry and especially an involute geometry with regard to their transverse axis, so that their width adapts homogenously when the brake is activated. Consequently, a flat friction surface of the friction strip pair is ensured and brake judder is largely ruled out. As an alternative, the inserts can have free-form geometry in their longitudinal and/or transversal direction, especially adapted to fulfilling the desired physical properties. Apart from increased strength and improved dampening of the brake disc, there is an additional important physical property that can be optimized, namely that the heat conductivity through the inserts and/or in the friction strip pair is adapted in such a way to the heat flux density that increases with the larger outer diameter that a mostly homogenous heat distribution is achieved without significant jumps, especially in the region of the friction strip pair.

To keep the thermal stress of the brake disc as low as possible, it is especially advantageous for the inserts to have cooling openings, particularly in the region of the friction strip pair. These can be advantageously square, elliptical, circular, trapezoidal and/or have the shape of a parallelogram. However, any other free-form geometry and/or other known geometric shapes are conceivable. Pertaining to the above, it is furthermore advantageous if the cooling openings have an axially elastic design and have especially an elliptical and/or parallelogram-shaped contour. The shape of the cooling openings influences axial elasticity. For example, a cooling opening having the shape of a parallelogram increases axial elasticity, whereas a square shape lowers it. Thus, it is possible to influence the friction ring's axial elasticity in a way to ensure a mostly smooth friction strip pair surface of the friction strip pair when the brake is activated at high speeds. It is also advantageous if the cooling openings in the axial direction of the inserts are punched holes, profiled openings, recesses and/or seams.

For additional weigh reduction of the brake disc it is especially advantageous for the pot to have material free spaces in its outer perimeter. These would be shaped in such a way that the strength of the form-fitting and/or substance-to-substance bond between pot and insert cannot be negatively influenced. Alternatively or optionally, it is likewise advantageous for the pot to have material free spaces on its inner perimeter. Apart from the weight savings, this has the additional advantage that the brake disc must not be necessarily mounted from the front to the wheel hub intended for it. Rather, it can also be mounted from the back. In this case, the left-out pot is first threaded from the front through a wheel hub that also has the corresponding recesses and twisted in such a way that the screwing-on areas of the wheel hub and the pot are oriented in overlapping fashion. Afterwards, the pot is screwed on the wheel hub, particularly from the back. This has the advantage of preventing the twisting of the pot between wheel hub and rim. As a result of that, it is much less likely for the pot to twist and break if the wheel nuts are not uniformly tightened.

It is also advantageous if the pot and the inserts are made from the same material and/or from one single piece, preferably using thermoforming because the manufacturing costs of the brake disc are greatly reduced as a result of this.

In this context, it is likewise advantageous for the pot and friction ring to be made from the same material by casting, since therefore the inserts can be surrounded form-fittingly and/or substance-to-substance with the casting material that forms the pot and friction ring in one work step, thus considerably lowering manufacturing costs.

Alternatively, it is advantageous if the friction ring, the pot and/or the inserts are made from different materials, as the optimal material can be selected depending on the individual requirements for the corresponding structural parts. In this respect, it is especially advantageous if the friction ring is made especially by casting, in particular from aluminum, gray cast iron or stainless steel cast, and the inserts are made especially with thermo-forming from steel sheet, stainless steel sheet and/or high strength, higher strength and/or highest strength steel materials. The result is a relatively light yet firm brake disc with a very good vibration and damping behavior.

It is also advantageous for the inserts to have a bending, especially in the region of the expansion element, so they can be adapted to the radial expansion of the friction ring caused by the heat. Furthermore, this bending is made in order to achieve elasticity through a constructively defined zone designed accordingly so the molded spots are relieved as much as possible of undesired supporting reactions, forces, momentums and vibrations.

According to the invention, the brake disc has a friction strip pair and a pot connected to each other through expansion elements, in which case the friction strip pair comprises a first friction strip and a second friction strip connected to one another through ribs. The cross section of the first friction strip and/or the second friction strip changes in the direction of the brake disc's perimeter, especially in its width, so that with regard to a weight-reduced brake disc, an optimum weight and maximum strength can be achieved at the same time. Furthermore, the brake disc's damping property can be optimized as a result of this.

It is particularly advantageous for the first friction strip and/or the second friction strip to have depressions and/or protrusions on the side facing towards the ribs or away from them so that they can change the cross-section width of the friction strip pair in the perimeter direction of the brake disc. Thus, in regions subject to high stresses, strength can be increased and the weight can be reduced in the regions where the stresses are lower.

It is also advantageous if at least some of the ribs are executed as inserts and the protrusions are arranged at least partially with these inserts and/or the depressions are arranged at least partially in the region between two neighboring ribs, as this constitutes an optimal adaptation to stress and/or damping.

It is also especially advantageous if the cross section of the first friction strip and/or second friction strip changes in the radial direction of the brake disc. With regard to this, it is especially good for the cross section to largely taper off in the direction of the pot in order to achieve an essentially optimized heat distribution with the associated stresses.

For the same purpose, it is also advantageous if the cross section of the first friction strip and/or second friction strip is at least largely wedge-shaped and/or has free-form geometry.

It is also advantageous if the subsequent course that does not follow the shortest radial path acts—at least radial-elastically similar to an expansion element, with rollover-compliant shape and therefore dampening—along the elastic length in control engineering fashion as $1^{st}$ degree mechanical dead time (T1) element, whereas a support that runs directly—and therefore radially—has a resulting harder characteristic curve. The adjustability of the characteristic curve takes place advantageously due to the fact that the course of the guiding curve, the length and/or the lateral contour of the expansion element in the bond are used in each case as the characteristic mechanical dead time (T1) element.

It is also advantageous if the friction strip pair has a first friction strip and second friction strip, in which case the cross-sectional width of at least one of these friction strips changes in the radial direction and decreases especially towards the pot in such a way that the heat flux density is compensated to such an extent that an essentially homogenous heat distribution is achieved in the friction ring. Thus, stresses in the friction ring can be advantageously reduced to a great extent. In this respect, it is particularly favorable if the cross section of the first friction strip and/or second friction strip has an essentially wedge-shaped design and/or has free-form geometry.

It is especially advantageous if the brake disk has a rotational axis around which the inserts essentially extend, especially spirally and/or involutedly and/or following free-form geometry, from their end facing the pot to their end facing the friction ring, largely from 0° to an angular range of 45° to 135°, in which case the ends of the inserts that face the friction ring especially point to that rotational direction that results from the forwards motion of a wheel intended for this. As a result of that, a highly homogenous mass distribution is generated radially in the friction ring, which has in turn a positive effect on the heat distribution in the friction ring. Therefore, a brake judder resulting from hot spot formation is essentially ruled out.

To ensure a sufficiently high strength of the brake disc of utility vehicles, it is especially advantageous for the pot and/or the inserts to consist of two or more steel sheets placed on top of one another.

For weight reduction, it helps a great deal if the pot is made of a pot ring and an inner pot pressed against one other to create a force-fitted and/or form-fitted connection. Thus, the pot ring and the friction strip pair can be advantageously cast together with the inserts, especially from gray cast iron, within one manufacturing step. For reducing weight, the inner pot—which is made especially from lighter die cast aluminum or aluminum sheet—is pressed in as part of a subsequent manufacturing step to make a force-fitted and/or form-fitted connection with the pot ring.

Alternatively, the pot ring can be executed as a supporting ring that at least connects some of the inserts executed as expansion elements to a unit so that a casting mold intended for this purpose can be quickly and easily fitted with this unit. The supporting ring can be executed as one piece with at least some of the expansion elements, especially from steel sheet, by deep-drawing and/or punching.

After fitting the casting mold, the supporting ring is once again removed in an embodiment and the ends facing the pot to be cast of the expansion elements at least partially formed by the inserts cast in form-fitted and/or substance-to-substance fashion to create a bond.

Alternatively, the supporting ring can also remain in the casting mold, however, and fully or at least partially be cast with the inner pot and/or pot to create a form-fitted, force-fitted or substance-to-substance bond.

In this embodiment and also when the inner pot is shrunk-on or pressed-on, it is particularly advantageous if the supporting ring has at least one recess, opening, groove, notch and/or a profile, so that an axially- or torsion-free positive bond is created between supporting ring and inner pot or pot.

Likewise, the supporting ring can also consist of a heat-fugitive material—especially wax—however, so that it dissolves with the pot during pouring.

In a brake disc according to the invention, especially one according to one or several of the preceding embodiments, with a friction ring and a pot that are connected to one another through expansion elements, the latter protrude from the pot largely in an angular range of 0° to 30°, preferably in an angular range of 5° to 10°, to ensure the brake disc's high strength.

It is likewise favorable for the expansion elements to enter the friction ring essentially in an angular range of 10° to 50°, preferably from 35° to 40°, because this improves the strength of the brake disc. Likewise, the flat exit angle of the expansion elements out of the pot and the flat entrance angle of the expansion elements into the friction ring allows the dampening and vibration behavior of the brake disc to be positively influenced. In friction rings with a friction strip pair, a very homogenous mass distribution in the friction ring can be achieved, especially by the relatively flat entrance angle. This reduces the formation of hot spots and the danger of the resulting brake judder.

An insert according to the invention, executed as an expansion element and/or a rib, for connection to a friction strip pair and/or a pot, that in an area intended for connection to a friction strip and/or pot has teeth and/or seams that during pouring create a solid form-fitted and/or substance-to-substance connection so an accidental loosening of the connection is largely and advantageously ruled out. In this respect, it is especially advantageous if the teeth and/or seams also have a tooth set that causes the teeth and/or seams to be alternately tilted towards each other, in which case they do not protrude along the entire overall thickness of the insert and can still be inserted in the seaming process necessary for the casting process in the core tool, in the joining gap dimensioned according to the maximum sheet thickness.

In a method for producing a brake disc according to the invention in which expansion elements are connected with a friction ring and/or a pot by casting, the friction ring and/or pot that still has at least one protective element after the connection, is cast with the protective element in one piece. Advantageously, the protection elements protect the expansion elements from damage during further processing steps.

It is likewise advantageous if the friction ring and/or pot is cast with a machining allowance so that material from the surface of the friction ring and/or pot can be removed for obtaining the desired surface finish without falling short of the tolerance limits of the given brake disc measures.

It is especially favorable if the expansion elements that have teeth and/or seams in the areas intended for connection with a friction strip pair and/or the pot and are cast between the friction strip pair and/or with the pot, in which case a largely substance-to-substance and/or form-fitted bond with the friction strip pair and/or pot is created with the teeth and/or seams. Advantageously, this ensures the high strength of the connection area of the brake disc's individual components. Alternatively, the teeth and/or seams can melt on and/or essentially away during casting with the friction strip pair and/or pot, thus creating an additional substance-to-substance bond.

So that the surface finish of the brake disc is improved after the casting process, the brake disc is advantageously bombarded for further processing with bombardment material, particularly gravel or sand, in which case the expansion elements are protected from damage by the protective elements.

It is likewise advantageous for the protective elements to be cut off for the final processing of the brake disc, so that the latter's properties are not negatively influenced, especially with regard to weight and cooling behavior.

There are additional advantages if the inserts are accordingly pre-treated with heat before the individual insert is introduced into the core tool intended for this. This can be done especially with the corresponding inductive and/or flame methods to ensure that during casting along the casting-on areas with the friction strip pair and/or pot, no undesired early cooling processes and resulting numerous structural and connection failures and their consequences such as chilling tendency and consecutive corrosion processes occur.

BRIEF DESCRIPTION OF THE DRAWINGS

Additional advantages of the invention are described in the embodiments listed below, which show.

DESCRIPTION

Figure 1:
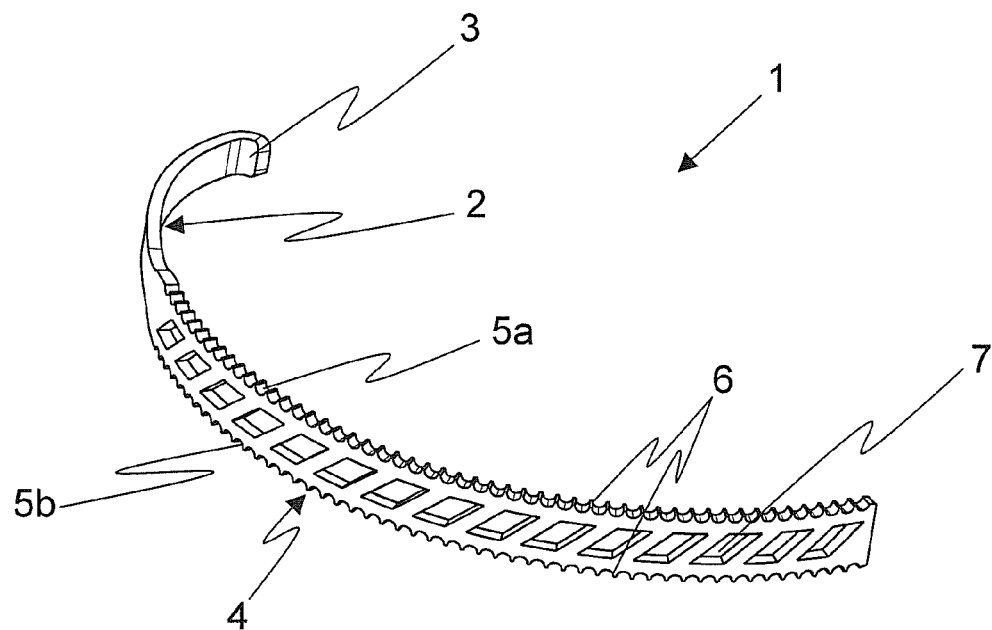
FIG. 1 is a perspective view of an insert, executed as an expansion element with a bending and an inner flexibility and rib.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a perspective view of an insert 1 that can be cast for manufacturing a composite brake disc with a friction ring and a pot. The insert 1 has a region in which it is executed as an expansion element 2. The expansion element 2 is longer than the shortest distance between pot and friction ring of a brake disc intended for it, so that as a result of this the radial elasticity of the brake disc is essentially ensured. Additionally, the expansion element 2 has a curvature in the longitudinal direction for creating the radial elasticity so the expansion element 2 can be adapted to the thermal deformation of the friction ring intended for this so the dishing of the friction ring can be largely excluded. In the end that will be attached to the pot, the expansion element 2 has a hook 3 for creating a strong, form-fitted bond between expansion element and pot. Furthermore, the expansion element 2 has at least partially a rib 4 for the intended friction ring, which preferably consists of a friction strip pair, in which case the insert 1 in the region of the rib 4 has teeth 6 provided on the connecting surfaces 5a, 5b for bonding to the friction strip pair. In the bond of insert 1 and friction strip pair preferably created by casting, the teeth 6 are fully or partially fused with the friction strip pair in order to create a strong form-fitted or substance-to-substance bond.

Figure 2:
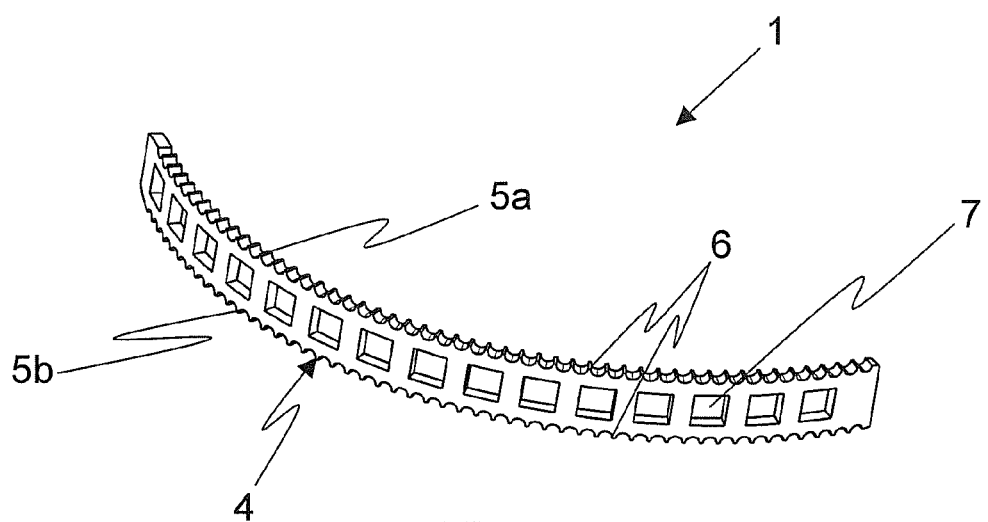
FIG. 2 is a perspective view of an insert executed as rib with a variation of the cooling openings.
Figure 3:
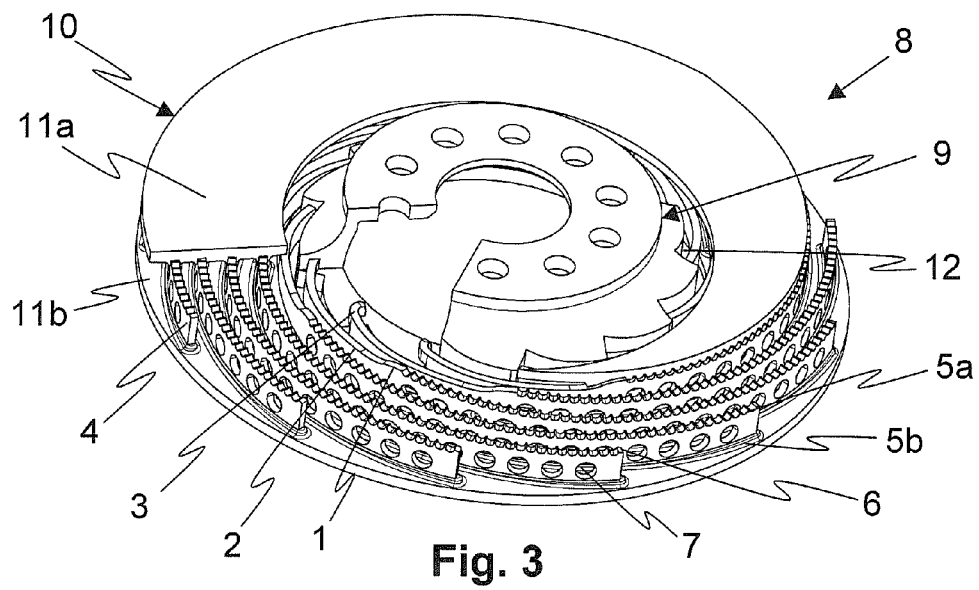
FIGS. 3 and 4 are a perspective view and a longitudinal section view of an inside-ventilated brake disc according to a first embodiment, in which the inserts are spirally bent in the direction of the pot.

In addition, the insert 1 has cooling openings 7 in the region of the rib 4 for ensuring a good ventilation of the brake disc. In this embodiment, the cooling openings have been executed in the form of parallelograms for improving the axial elasticity of the insert 1 in transversal direction in the region of the rib 4. A significant problem of the braking process lies in the fact that the surface of the friction strip pair is deformed in a non-homogenous way when the brakes are applied owing to the uneven distribution of materials within the friction ring caused by the ribs. The consequence is an undesired brake judder that the correspondingly shaped cooling openings 7 can largely reduce by adjusting the insert 1 in the region of the rib 4 in transversal direction to the applied brake force. However, as shown in FIG. 2 or 3, the cooling openings 7 can also have square or circular shapes for influencing the axial elasticity of the insert 1 in the region of the rib 4. Alternatively or redundantly, the rib 4 of the insert 1 can also have for this purpose a kink or bending in longitudinal direction.

FIG. 2 shows an insert 1 executed as rib 4 for connection to a friction strip pair. To accomplish this, the connecting surfaces 5a, 5b of the rib 4 that faces the friction strip pair have teeth 6 that melt away fully or partially when the friction strip pair is bonded by casting for creating a strong, substance-to-substance or form-fitted bond. To protect a wheel bearing from overheating, the rib 4 has a bent shape so it can supply cold air in the direction of the pot when there is a rotation. Additionally, the rib 4 has cooling openings 7 executed as squares in this embodiment for reducing the axial elasticity of the insert 1.

Figure 4:
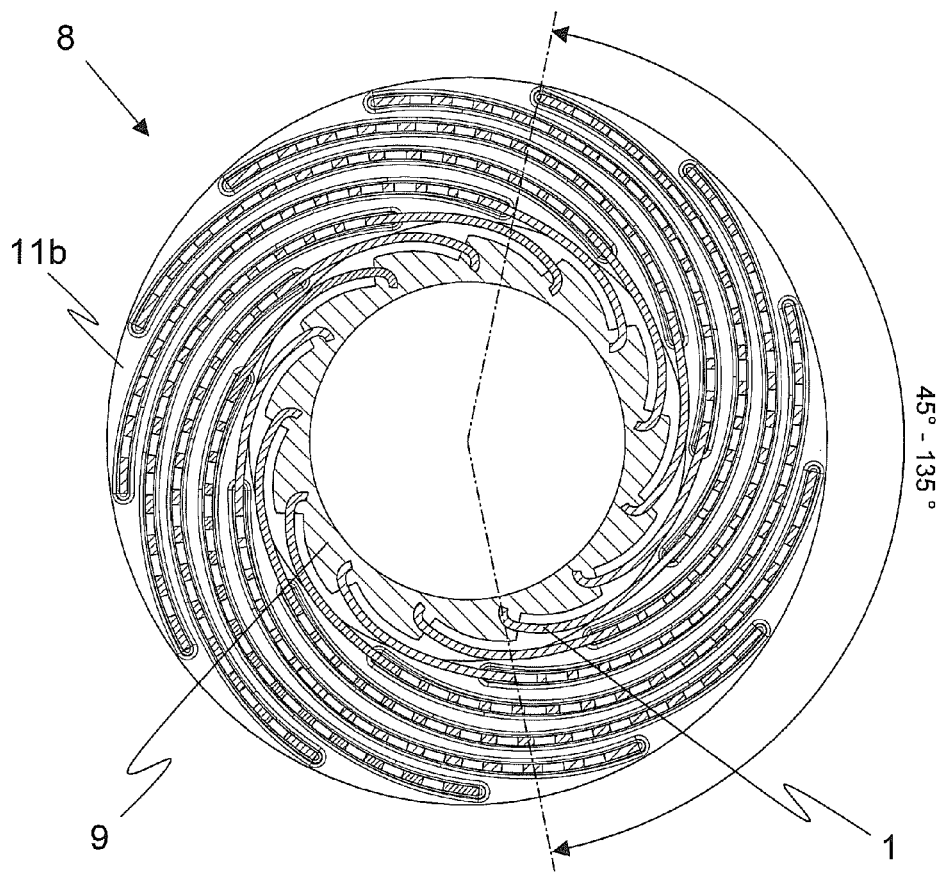

FIGS. 3 and 4 show a perspective view and a longitudinal section of an inside-ventilated brake disc 8 that has a pot 9 and a friction ring 10, in which case the friction ring 10 consists of a friction strip pair 11a, 11b connected to one another through ribs 4. Along the outer perimeter of the pot 9 inserts 1 have been arranged according to the embodiment of FIG. 1 for bonding the pot 9 with the friction ring 10 in radially elastic fashion. To accomplish this, the inserts 1 have expansion elements 2 form-fittingly bonded with a hook 3 at their end that faces the pot 9. In the region of the friction ring 10, the inserts 1 are executed as ribs 4 and in their connecting surfaces 5a, 5b that face the friction strip pair 11a, 11b they have teeth 6 that when the form-fitted and/or substance-to-substance bond is created, they melt away at least partially. In order to counter thermal stresses, the inserts 1 have circular cooling openings 7 in the region of the rib 4. Furthermore, the pot 9 has material-free spaces 12 on its outer perimeter, in the connecting region with the inserts 1, for reducing the weight of the brake disc 8. As a result of this, the pot 9 gets a profile resembling a saw tooth.

As can be seen in FIG. 4, the inserts 1 extend spirally from their end facing the pot 9 all the way to their end facing away from the pot 9 in an angular range of about 150°. Advantageously, a very good mass distribution is achieved as a result of this in the region of the brake disc 8, so that a brake judder caused by undesired hot spot formation is largely ruled out. In order to achieve this, it is necessary for the inserts 1 to protrude in a very flat angle with regard to the outer perimeter of the pot 9, preferably in an angular range of 5° to 10°, as well as to enter in an acute angle with regard to the inner perimeter of the friction ring 10, preferably in an angular range of 35° to 40°. This has the advantage of positively influencing the dampening, vibration and strength behavior of the brake disc, among other things.

Figure 5:
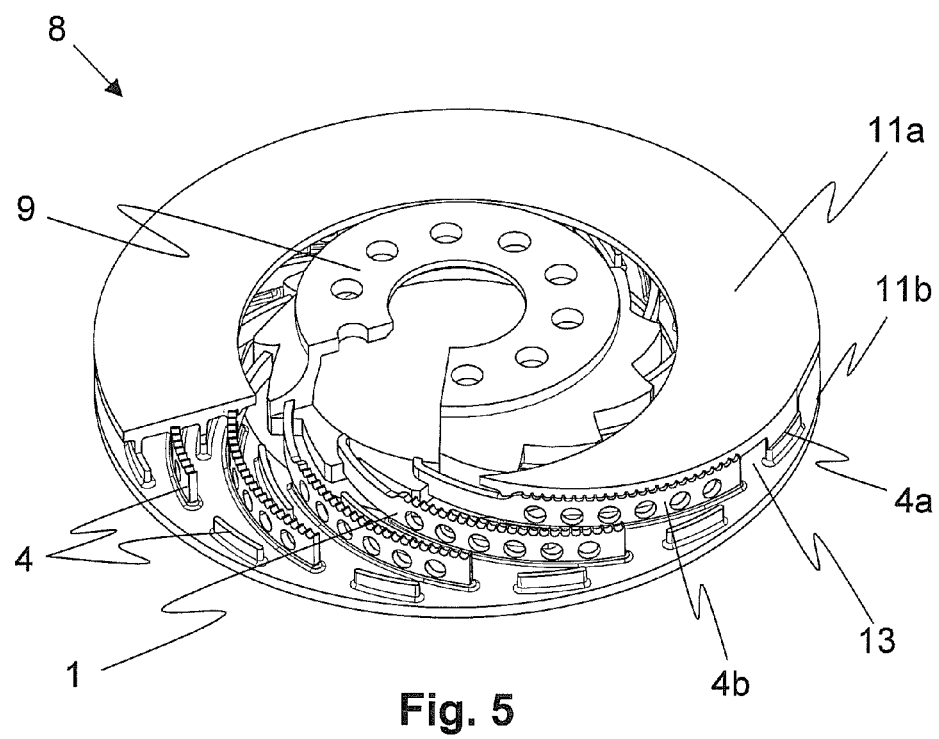
FIG. 5 is a perspective view of an inside-ventilated brake disc according to the first embodiment, in which the inserts only partially form the ribs, are executed in spiral shape, and end tangentially with regard to the outer radius of the friction ring.

FIG. 5 shows a perspective view of an inside-ventilated brake disc 8 in accordance with the first embodiment of FIGS. 3 and 4 with inserts 1 that extend spirally and are bent in the direction of the pot 9. Compared to FIGS. 3 and 4, the inserts 1 form only partially the ribs 4a, 4b, however. The rib 4a, 4b has several parts, and one part of rib 4a has been cast as one single piece with the friction strip pair 11a, 11b. The second part of rib 4b is formed by the insert 1. Furthermore, the rib 4a, 4b has a recess 13 and this recess 13 of the rib 4a, 4b especially reduces the weight of the brake disc 8, but the damping and vibration behavior can also be influenced by this.

Figure 6:
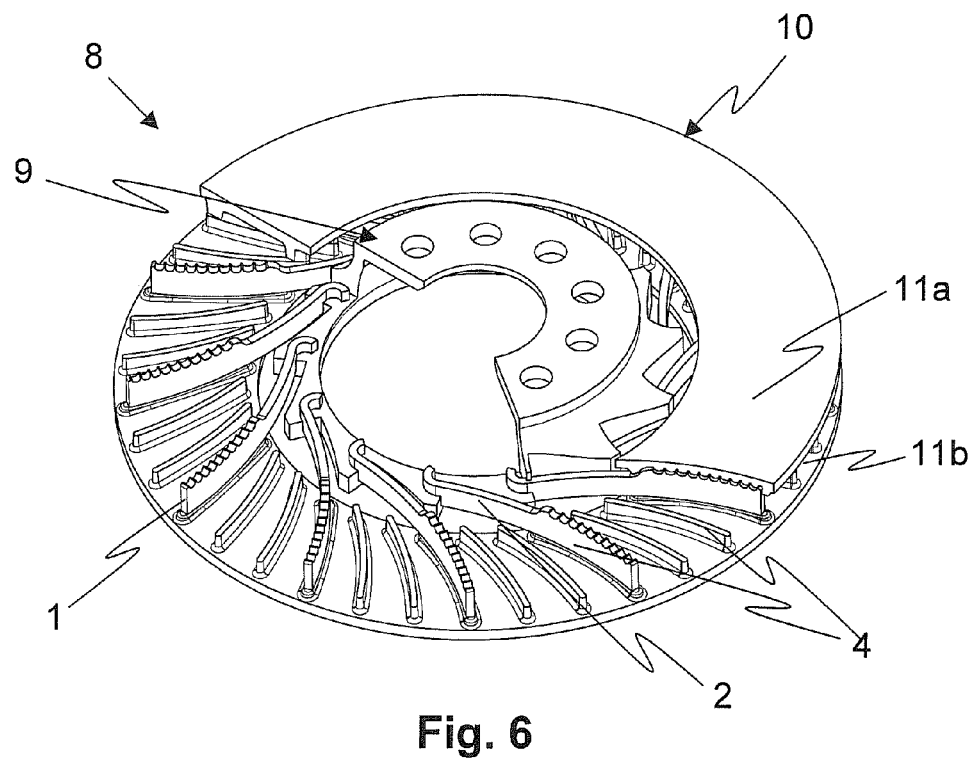
FIGS. 6 and 7 are a perspective view and a longitudinal section view of an inside-ventilated brake disc according to the second embodiment, in which the inserts are bent in the direction of the friction ring.
Figure 7:
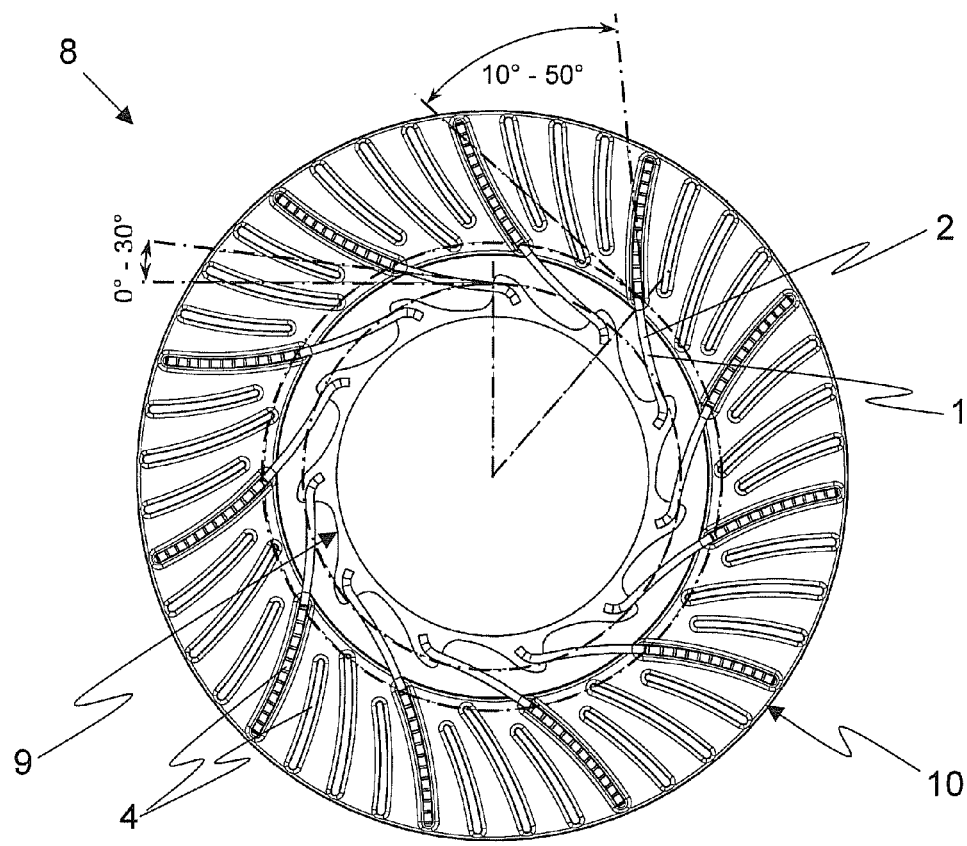

In a second embodiment shown in FIGS. 6 and 7, the inserts 1 of the inside-ventilated brake disc 8 are bent in such a way that they do not run spirally according to the first embodiment shown in FIGS. 3, 4 and 5, but—similarly to an involute following especially free-form geometry—are bent outwards, thus pointing towards the friction ring 10. Additionally, the ribs 4 are executed as one single piece, in which case they are either formed by one of the inserts 1 or cast as one piece with the friction strip pair 11a, 11b. In this embodiment too, the inserts 1 comprise an expansion element 2 that connects the pot 9 in radial elastic fashion with the friction ring 10. The bond between the inserts 1 and the friction strip pair 11a, 11b as well as the pot 9 is a form-fitted or substance-to-substance one, created in a casting technology process.

As can be seen in FIG. 7, the expansion elements 2—executed as inserts 1 here—protrude from the pot 9 essentially in an angular range of 0° to 30°, preferably in an angular range of 5° to 10°. Furthermore, they enter the friction ring 10 relatively flat in an angular range of 10° to 50°, preferably in an angular range of 35° to 40°. As a result of this, the brake disc 8 becomes very strong and the ribs 4 (which are partially formed by the inserts 1) achieve a very good mass distribution.

Figure 8:
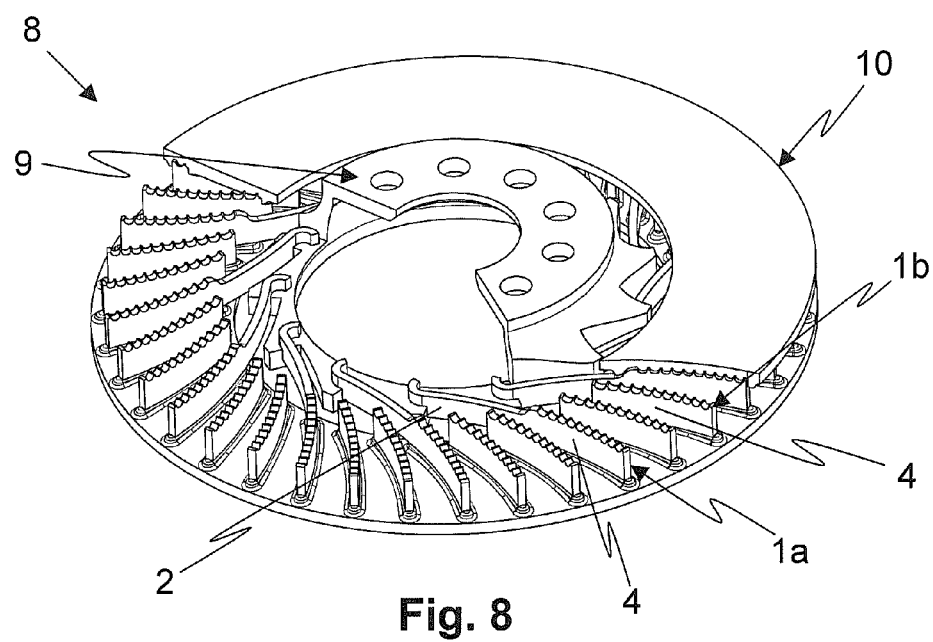
FIG. 8 is a perspective view of an inside-ventilated brake disc according to the second embodiment, in which the inserts are executed as expansion elements and/or ribs.

FIG. 8 shows an inside-ventilated brake disc 8 based on the second embodiment characterized by the fact that every one of the ribs 4 is formed by an insert 1a, 1b. Here, insert 1a consists—according to the embodiment shown in FIG. 1—of an expansion element 2 and the rib 4. Insert 1b comprises—according to the embodiment shown in FIG. 2—exclusively the rib. Consequently, with regard to a weight optimization of the brake disc 8 for the inserts 1a, 1b, lighter material can be used (especially stainless steel sheet, high-, higher- or highest-strength steel sheet).

The brake discs 8 shown in FIGS. 3 to 8 are manufactured in a casting process. In this case, the inserts 1 are produced in an initial processing step by deep-drawing, punching, bending and/or seaming as well as setting the teeth 6. Afterwards, the inserts 1 are recast as a form-fitted and/or substance-to-substance bond with gray cast iron for building the pot 9 and the friction ring 10. Alternatively, however, the friction ring 10 can at first be cast merely from gray cast iron and later overlaid with aluminum for reducing the weight of the pot 9.

Figure 9:
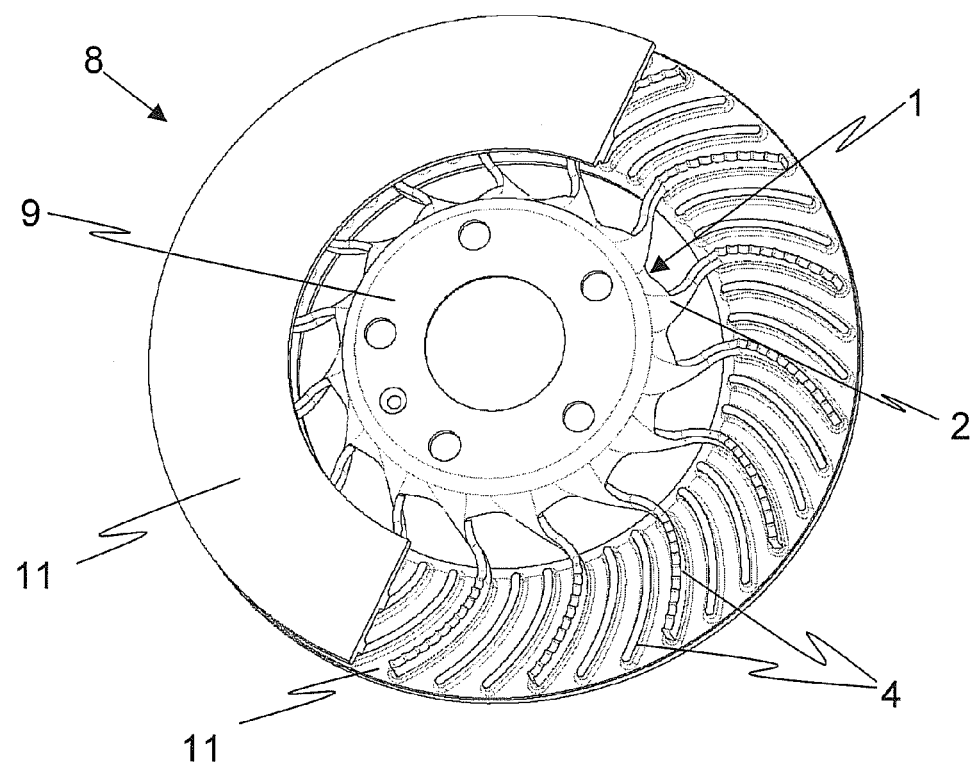
FIG. 9 is a perspective view of an inside-ventilated brake disc according to a third embodiment, in which the insert forms the pot, the expansion elements and some ribs, in which case the insert has been executed as one piece through punching or deep drawing.

Alternatively, the inserts 1 can also be produced as one piece with the pot, especially from stainless steel, as shown in FIG. 9. The insert 1 therefore comprises as one piece the pot 9, the expansion elements 2 and a certain number of ribs 4. A second processing step casts the insert 1 with the friction strip pair 11a, 11b in the area of the ribs 4, whereby a part of the ribs 4 is cast as one piece with the friction strip pair 11a, 11b.

Figure 10:
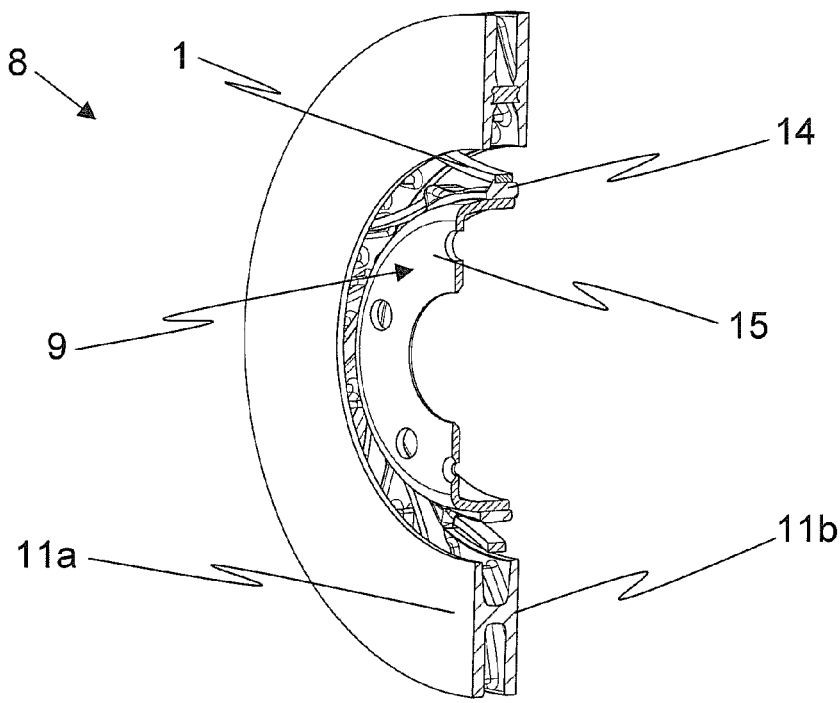
FIG. 10 is a perspective view of an inside-ventilated brake disc according to a fourth embodiment, in which an inner pot has been pressed onto a pot ring in a force-fitted way.

An additional alternative embodiment of the brake disc 8 is shown in FIG. 10. In this case, analogously to the variants of the brake disc 8 shown in FIGS. 3, 4, 5, 6, 7 and 8, the inserts 1 are form-fittingly and/or substance-to-substance bonded by casting with the friction strip pair 11a, 11b and the pot 9. In this case, however, the pot 9 is made up of a pot ring 14 and an inner pot 15. Advantageously, the inner pot 15 can be made from a lighter material to be bonded by casting (especially aluminum die casting) in a more expensive and laborious way and then pressed in a force-fitted and/or substance-to-substance fashion onto the pot ring 14 only after the inserts 1 are bonded to the friction strip pair 11a, 11b and the pot ring 14 by casting. The relatively lightweight inner pot 15 makes it possible to achieve an enormous weight reduction of the brake disc 8.

In an alternative embodiment (not shown), the pot ring 14 can be executed as supporting ring 14', which essentially accommodates the inserts 1 provided with an expansion region as one piece. After the supporting ring 14' and the friction strip pair 11a, 11b were cast (especially from the same material), there is the possibility of subsequently casting the inner pot 15 with the supporting ring 14' from another material, preferably from aluminum, for reducing weight. Furthermore, the connection between supporting ring 14' and inner pot 15 can take place via form- and/or force-fitting, i.e. via joining methods such as pressing-on or shrinking and/or using at least a torsion-supporting interlocking element (not shown).

Figure 11:
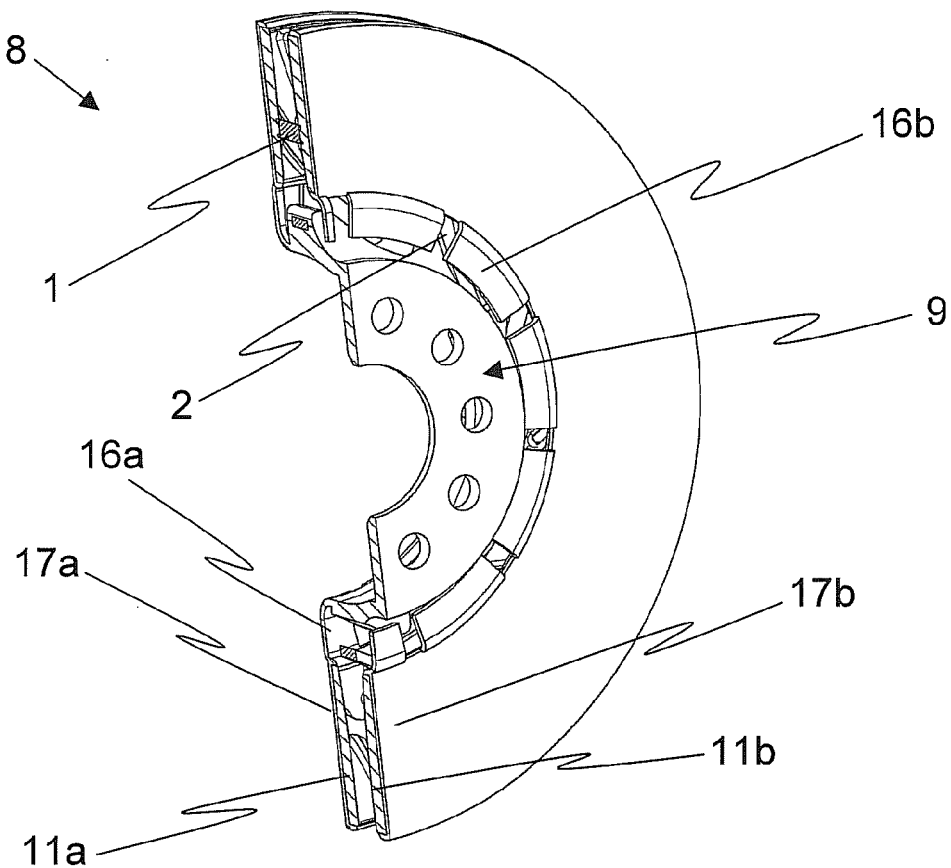
FIGS. 11 and 12 are a perspective view and a cross section view of a brake disc that is being produced with protective elements for protecting the expansion elements.
Figure 12:
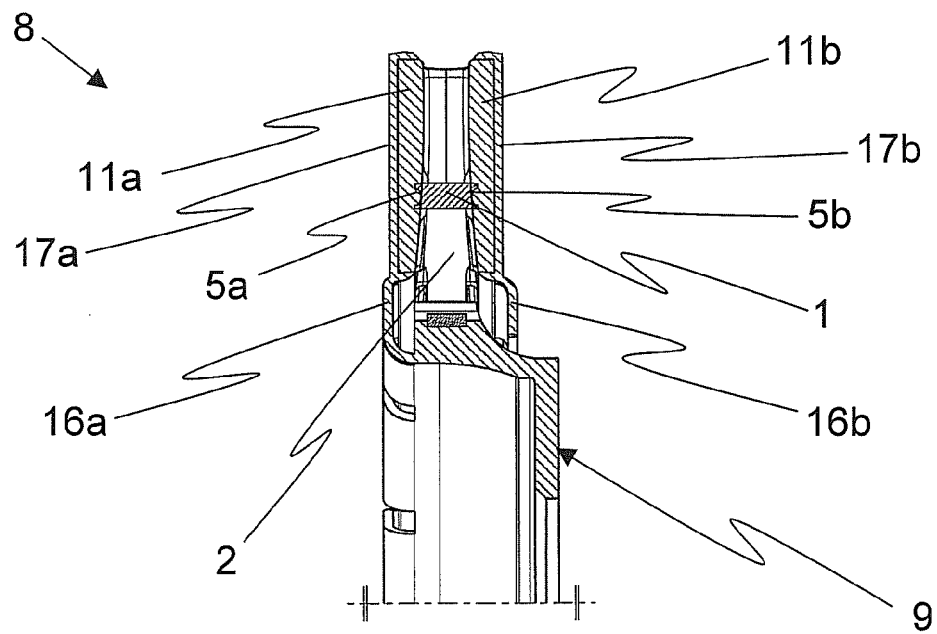

FIG. 11 and FIG. 12 show a perspective view and a cross section of a brake disc 8 being manufactured, in which the inserts 1 are recast with the friction strip pair 11a, 11b and the pot 9. Here, the friction strip pair 11a, 11b has been provided with a processing addition 17a, 17b that is removed in a downstream processing step for achieving an ideal surface finish. This is done with the help of a bombardment material (especially gravel or sand) that is shot at the brake disc 8 at high speed. So that the expansion elements 2 of the inserts 1 are not damaged in this downstream step, the brake disc 8 has protective elements 16a, 16b, whereby the friction ring and/or the pot with the protective elements 16a, 16b are cast in one piece in the upstream casting process. Only afterwards are the protective elements 16 severed for completing the processing of the brake disc 8.

It can furthermore be seen in FIG. 12 that the teeth 6 (see FIG. 1) of the inserts 1 can be melted at least partially on the connecting surfaces 5a, 5b so that a positive connection (at least partial) with the friction strip pair 11a, 11b can exist.

Figure 13:
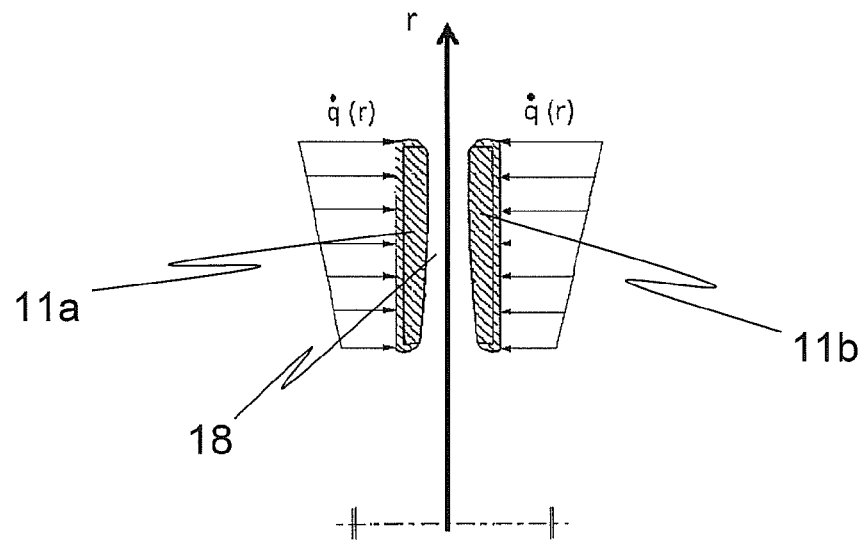
FIGS. 13, 14 and 15 are a cross section view through a friction strip pair with heat flux density plotted in the radial direction, as well as a stress and expansion curve.
Figure 14:
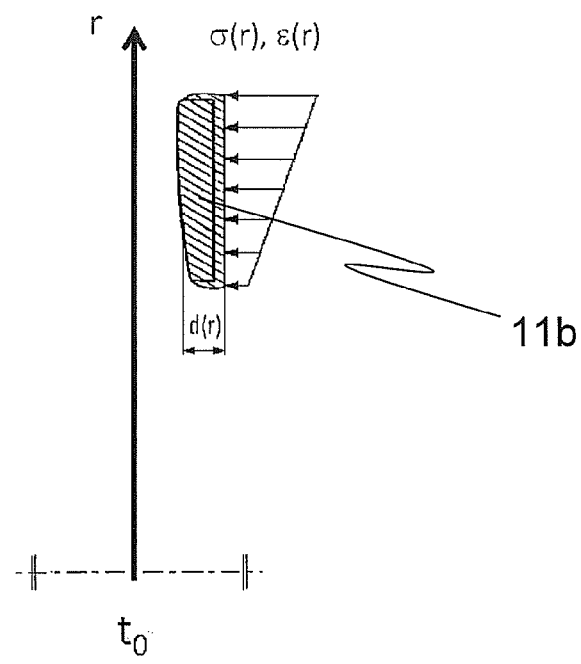
Figure 15:
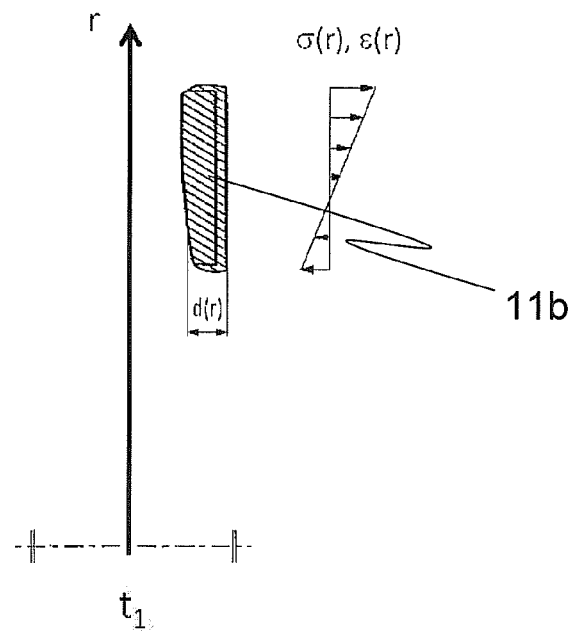

FIGS. 13, 14 and 15 show a cross section through a friction strip pair 11a, 11b with a graph showing the heat flux density as well as the stress and elongation course. In this case, the cross section course of the friction strip pair 11a, 11b has been adjusted in radial direction so that with radially increasing heat flux density there is an optimal resistance to the heat-induced stresses thanks to their cross section designed in the shape of a free form surface functionally seen above the radius.

Figure 16:
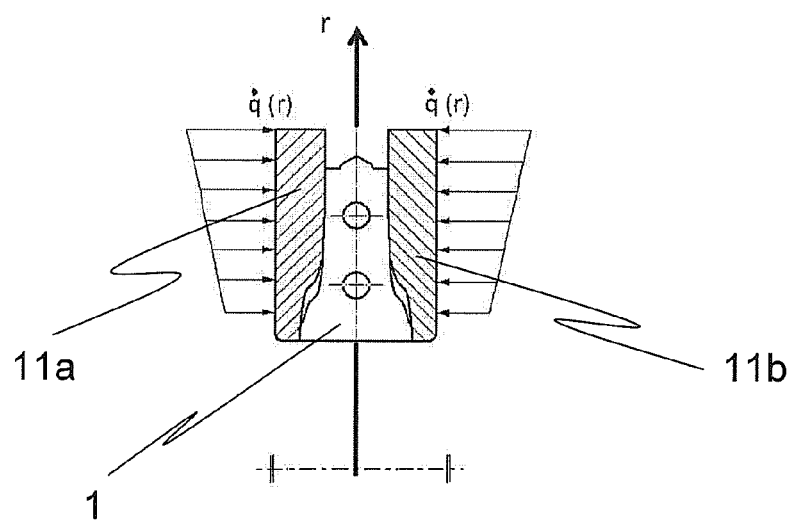
FIGS. 16, 17 and 18 are a cross section view through an alternative embodiment of a friction strip pair with heat flux density plotted in the radial direction, as well as a stress and expansion curve.
Figure 17:
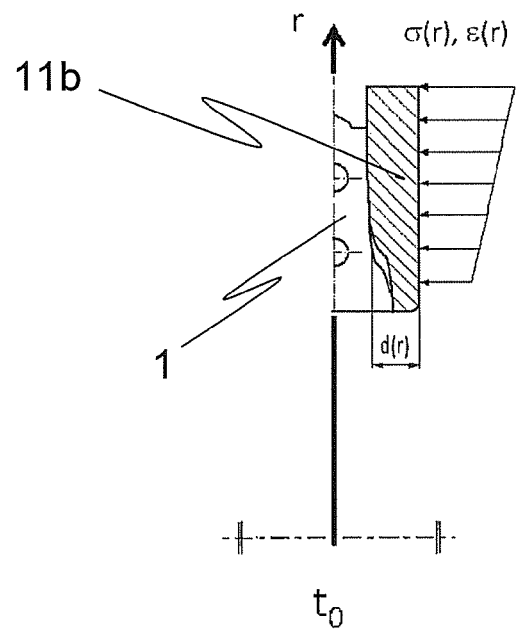
Figure 18:
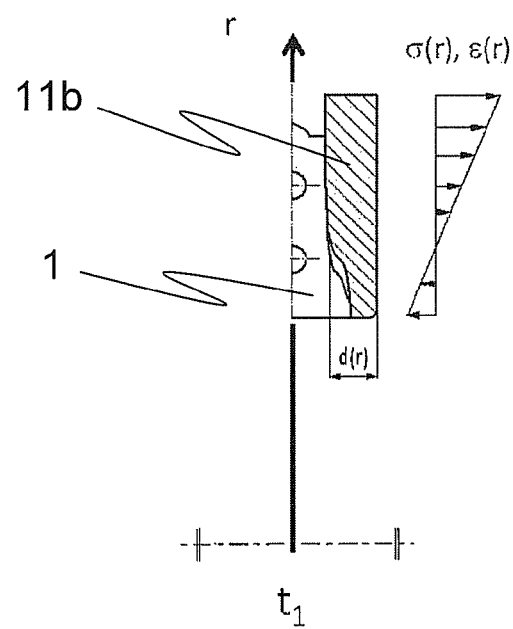

FIGS. 16, 17 and 18 additionally show an alternative embodiment of a friction strip pair with heat flux density plotted in radial direction as well as the course of the stress and elongation. Here, the inner surfaces of the friction strips 11a, 11b have free form geometry.

The functional heat-transition increasing design of the inner contour of the friction strip pair 11a, 11b pertaining to the cross section especially represents at least a third degree parabola or one with a higher odd-numbered degree that is overlapped before the inflection point by a depression and/or elevation that strengthens the surface and thereby the convection, in which case steep contour transitions are prevented by a design accomplished by appropriate casting.

In the necessary areas, especially towards the outer side of the friction ring areas, this inner contour designed like a free-form surface ensures with the increase of the heat flux density through the hereby associated material thickness, sufficient resistance momentum that counters bending perpendicular to the axis r in order to largely rule out a tilting of the friction pair ring 11a, 11b in axial direction, thus largely excluding a one-sided stress and with it an accompanying higher frictional wear of the brake pads.

Between the friction strip pair 11a, 11b there is a cooling channel 18 that with the help of the friction strip pair 11a, 11b stressed with the radially increasing heat flux density has been designed in such a way for the heat-dissipating air flow according to optimized fluid technology that the friction strip pair 11a, 11b is relieved especially thanks to air turbulence and an optimal heat transition. Furthermore, the cooling channels 18 of the brake disc have no fastening elements whatsoever to ensure the optimal perfusion of the cooling channels 18.

Figure 19:
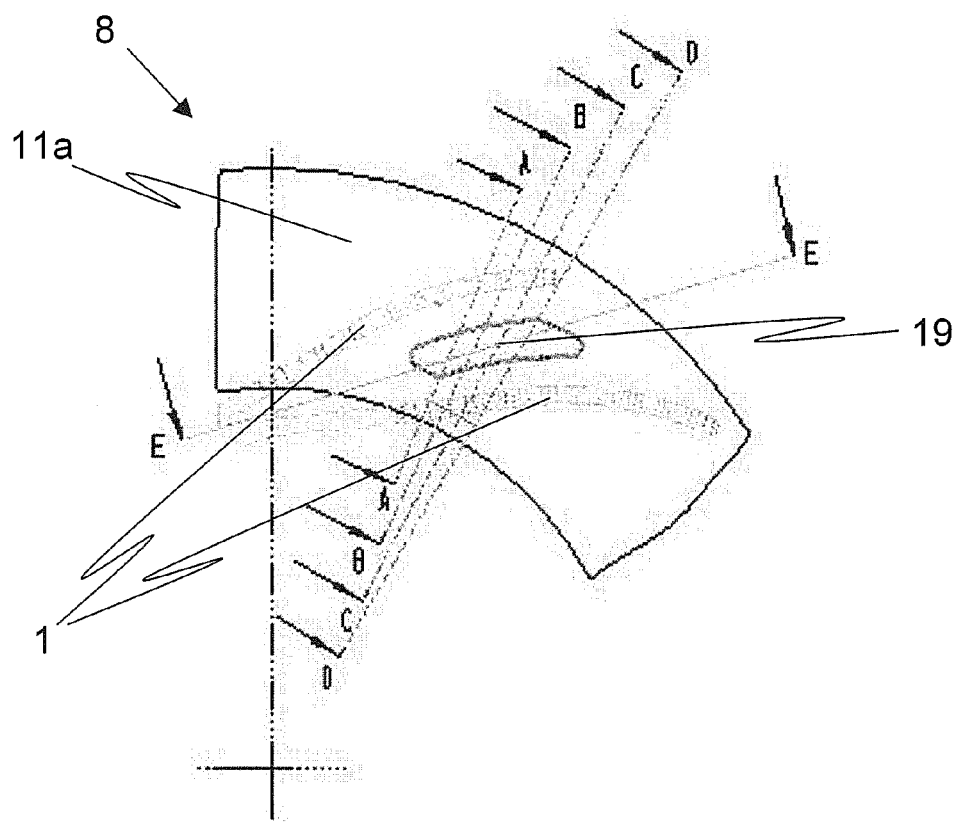
FIGS. 19, 20 and 21 are a partial section view of a brake disc with depressions and various cuts through them.
Figure 20:
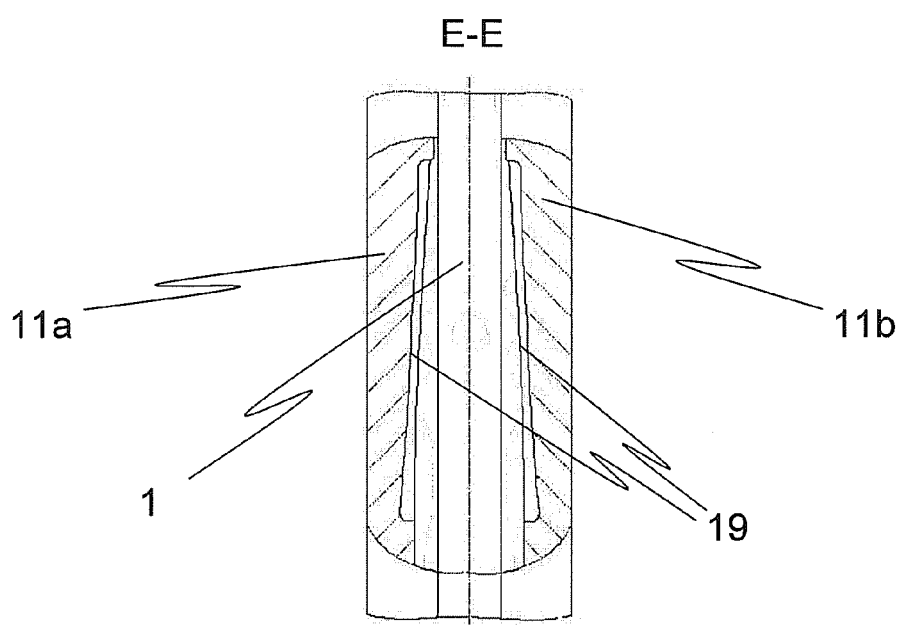
Figure 21:
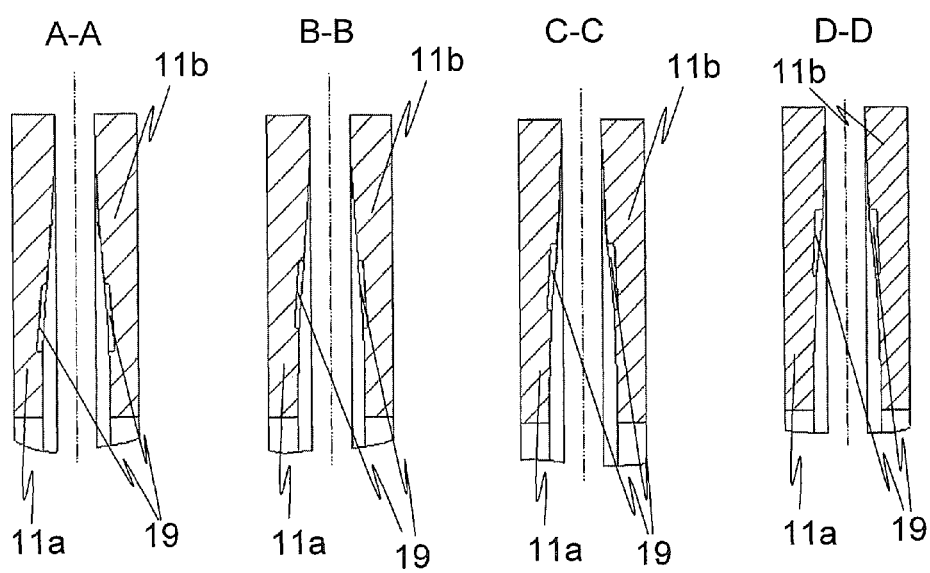

FIGS. 19, 20 and 21 show a partial region of a brake disc 8 with various sectional views of depressions 19. It can be recognized here that—especially owing to the depression 19—the cross section of the first friction pair 11a and/or the second friction pair 11b changes in the peripheral direction of the brake disc 8, particularly in its width, so that the best possible combination of weight and maximum stability can be accomplished with regard to a brake disc weight reduction. Furthermore, the dampening property of the brake disc can be optimized as a result of this.

Incidentally, the invention is not restricted to the embodiments shown. Moreover, all combinations of the described individual features as they have been shown or described in the claims, the description and the figures, are the object of the invention as far as the corresponding combination is technically possible or appears sensible.

The invention claimed is:

1. A brake disc for vehicles, comprising:
a friction ring, said friction ring comprising a pair of friction strips;
a plurality of ribs disposed between and connecting said friction strips;
a pot, said pot further comprising a plurality of expansion elements extending outwardly from an outer perimeter of said pot towards said friction ring, said expansion elements connected to said friction ring at an end of said expansion elements opposite from said pot;
wherein at least some of said ribs extend radially from said expansion elements; and
wherein at least some of said ribs or said expansion elements comprise inserts that are separately formed from said friction strips and connected to said friction strips;
wherein said inserts comprise cooling openings along a portion thereof connected to said friction strips; and
wherein said cooling openings have one of an elliptical or parallelogram axially elastic shape.

2. The brake disc as in claim 1, wherein said pot has spaces around said outer perimeter that are material-free.

3. The brake disc as in claim 1, wherein said inserts comprise a longitudinal bend and are adaptable to radial expansion of said friction ring caused by heat.

4. The brake disc as in claim 1, wherein at least one of said friction strips has a cross-section that changes in width along a peripheral direction of said friction strip.

5. The brake disc as in claim 4, wherein said friction strip comprises any combination of depressions or elevations on a side thereof generating said width changes in said peripheral direction.

6. The brake disc as in claim 1, wherein at least one of said friction strips comprises a cross section that tapers in width in a radial direction towards said pot.

7. The brake disc as in claim 6, wherein said friction strip comprises a wedge-shaped cross-sectional profile from an outer peripheral portion towards said pot.

8. The brake disc as in claim 1, wherein said expansion elements extend out from said pot in an angular range of from 0 degrees to 30 degrees.

9. The brake disc as in claim 8, wherein said expansion elements enter into said friction ring in an angular range of from 10 degrees to 50 degrees.

10. The brake disc as in claim 1,
wherein said expansion elements have a length that is longer than a shortest distance between said pot and said friction ring, and said expansion elements and respective said ribs extend circumferentially in a rotational direction of the brake disc from said pot, said expansion elements thereby being radially elastic and adjustable to thermal deformation of said friction ring.

11. The brake disc as in claim 1, wherein said expansion elements extend circumferentially from said pot in an angular range of from 45 degrees to 135 degrees.

12. The brake disc as in claim 1, further comprising a cast substance-to-substance connection between said inserts and said friction strips.

13. The brake disc as in claim 1, further comprising a form-fitted connection between said inserts and said friction strips.

14. The brake disc as in claim 13, wherein said inserts comprise connecting surfaces for connection to said friction strips, said connecting surfaces comprising at least partially melted teeth that form said connection between said inserts and said friction strips.

15. The brake disc as in claim 1, wherein said inserts have a bend along a portion thereof connected to said friction strips so as to be axially elastic in a region of said friction strips.

\* \* \* \* \*